United States Patent
Seo et al.

(10) Patent No.: US 11,579,714 B2
(45) Date of Patent: Feb. 14, 2023

(54) APPARATUS AND METHOD FOR PROVIDING MEMO FUNCTION

(71) Applicant: Samsung Electronics Co., Ltd., Suwon-si (KR)

(72) Inventors: Heung Kyo Seo, Seoul (KR); Kyung Hwa Kim, Seoul (KR); Soo Jung Bae, Seoul (KR); Hee Woon Kim, Suwon-si (KR); Ah Young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/497,347

(22) Filed: Oct. 8, 2021

(65) Prior Publication Data
US 2022/0026995 A1   Jan. 27, 2022

Related U.S. Application Data

(63) Continuation of application No. 17/065,976, filed on Oct. 8, 2020, now Pat. No. 11,169,627, which is a (Continued)

(30) Foreign Application Priority Data

Jul. 10, 2015 (KR) .......................... 10-2015-0098691

(51) Int. Cl.
*G06F 3/038* (2013.01)
*G06F 3/0488* (2022.01)
(Continued)

(52) U.S. Cl.
CPC ............ *G06F 3/038* (2013.01); *G06F 1/3215* (2013.01); *G06F 1/3265* (2013.01);
(Continued)

(58) Field of Classification Search
CPC .... G06F 3/038; G06F 3/03545; G06F 3/0481; G06F 3/0488; G06F 3/04883;
(Continued)

(56) References Cited

U.S. PATENT DOCUMENTS 6,681,333 B1   1/2004   Cho
6,924,791 B1   8/2005   Nicolas et al.
(Continued)

FOREIGN PATENT DOCUMENTS

CN   2731555 Y   10/2005
CN   101836179 A   9/2010
(Continued)

OTHER PUBLICATIONS

Chinese Office Action dated Jan. 25, 2019, issued in the Chinese patent application 201610541387.0.
(Continued)

*Primary Examiner* — Sardis F Azongha
(74) *Attorney, Agent, or Firm* — Jefferson IP Law, LLP

(57) ABSTRACT

An electronic device is provided. The electronic device includes a display, an electronic pen, a slot in which the electronic pen can be inserted in or detached from, a pen sensing module configured to sense an insertion/detachment of the electronic pen, a pen input module configured to receive an input using the electronic pen, and a processor configured to activate the pen input module while the display maintains an OFF-state when the detachment of the electronic pen is sensed within the OFF-state of the display.

14 Claims, 15 Drawing Sheets

Related U.S. Application Data continuation of application No. 16/272,222, filed on Feb. 11, 2019, now Pat. No. 10,817,084, which is a continuation of application No. 15/205,790, filed on Jul. 8, 2016, now Pat. No. 10,228,779.

(51) Int. Cl.

| | | |
|---|---|---|
| *G06F 1/3215* | (2019.01) | |
| *G06F 3/0481* | (2022.01) | |
| *G06F 3/0354* | (2013.01) | |
| *G06F 1/3234* | (2019.01) | |
| *G06F 3/0482* | (2013.01) | |
| *G06F 3/04883* | (2022.01) | |
| *G06F 3/04886* | (2022.01) | |

(52) U.S. Cl.
CPC ........ *G06F 3/03545* (2013.01); *G06F 3/0481* (2013.01); *G06F 3/0482* (2013.01); *G06F 3/0488* (2013.01); *G06F 3/04883* (2013.01); *G06F 3/04886* (2013.01); *G06F 2200/1632* (2013.01); *G06F 2203/04803* (2013.01); *Y02D 10/00* (2018.01)

(58) Field of Classification Search
CPC ....... G06F 3/04886; G06F 2203/04803; G06F 1/3215; G06F 1/3265
See application file for complete search history.

(56) References Cited

U.S. PATENT DOCUMENTS

| | | |
|---|---|---|
| 7,046,237 B1 | 5/2006 | Nicolas et al. |
| 7,626,582 B1 | 12/2009 | Nicolas et al. |
| 8,654,086 B2 | 2/2014 | Nicolas et al. |
| 8,890,855 B1 | 11/2014 | Lee et al. |
| 8,948,819 B2 | 2/2015 | Yun et al. |
| 9,286,895 B2 | 3/2016 | Jung et al. |
| 9,395,800 B2 | 7/2016 | Liu et al. |
| 9,600,178 B2 | 3/2017 | Yun et al. |
| 9,823,758 B2 | 11/2017 | Pedersen et al. |
| 10,496,732 B2 | 12/2019 | Lee et al. |
| 2007/0282208 A1 | 12/2007 | Jacobs et al. |
| 2008/0005423 A1 | 1/2008 | Jacobs et al. |
| 2008/0036747 A1 | 2/2008 | Hope |
| 2009/0273587 A1 | 11/2009 | Tsuei et al. |
| 2010/0045626 A1 | 2/2010 | Nicolas et al. |
| 2010/0207897 A1 | 8/2010 | Ono |
| 2012/0302167 A1 | 11/2012 | Yun et al. |
| 2013/0082937 A1 | 4/2013 | Liu et al. |
| 2013/0311922 A1 | 11/2013 | Park |
| 2014/0015783 A1 | 1/2014 | Jeon |
| 2014/0160045 A1 | 6/2014 | Park et al. |
| 2014/0180481 A1 | 6/2014 | Park et al. |
| 2014/0325402 A1 | 10/2014 | Jung et al. |
| 2015/0022471 A1 | 1/2015 | Kwak et al. |
| 2015/0116251 A1 | 4/2015 | Yun et al. |
| 2015/0156290 A1 | 6/2015 | Amit et al. |
| 2016/0012029 A1 | 1/2016 | Joo |
| 2016/0109968 A1 | 4/2016 | Roh et al. |

FOREIGN PATENT DOCUMENTS

| | | |
|---|---|---|
| CN | 102855079 A | 1/2013 |
| CN | 103870028 A | 6/2014 |
| CN | 104363989 A | 2/2015 |
| KR | 10-2006-0023678 A | 3/2006 |
| KR | 10-2007-0009041 A | 1/2007 |
| KR | 10-2014-0082187 A | 7/2014 |
| KR | 10-2015-0049117 A | 5/2015 |
| KR | 10-2015-0062691 A | 6/2015 |
| KR | 10-2016-0046668 A | 4/2016 |
| KR | 10-2016-0058526 A | 5/2016 |
| TW | 200828067 A | 7/2008 |

OTHER PUBLICATIONS

European Examination Report dated Sep. 21, 2017, issued in European Application No. 16178843.5.
Indian Office Action dated Jun. 3, 2020, issued in Indian Application No. 201737015239.

APPARATUS AND METHOD FOR PROVIDING MEMO FUNCTION

CROSS-REFERENCE TO RELATED APPLICATION(S)

This application is a continuation application of prior application Ser. No. 17/065,976, filed on Oct. 8, 2020; which is a continuation application of prior application Ser. No. 16/272,222, filed on Feb. 11, 2019, which issued as U.S. Pat. No. 10,817,084 on Oct. 27, 2020; which is a continuation application of prior application Ser. No. 15/205,790 filed on Jul. 8, 2016, which issued as U.S. Pat. No. 10,228,779 on Mar. 12, 2019, and which was based on and claimed priority under 35 U.S.C. § 119(a) of a Korean patent application number 10-2015-0098691 filed on Jul. 10, 2015, in the Korean Intellectual Property Office, the disclosure of each of which is incorporated by reference herein in its entirety.

TECHNICAL FIELD

The present disclosure relates to a technology for providing a memo function in an electronic device configured to include an electronic pen such as a stylus.

BACKGROUND

Electronic devices, such as a smart phone, a tablet computer, etc., support a memo or note function. For example, a user executes a memo application of the electronic device to input a memo. In addition, the user generates and stores the memo through a user input (e.g., a touch input or stylus) after setting the electronic device to a state that enables the user to input the memo like the execution of the note application.

Since a memo function of the related art is provided by executing the application installed on the electronic device, the user is required to push a power button or a home button to turn on a display of the electronic device, unlock the electronic device, and execute the memo application so as to generate and store the memo when the display of the electric device is in an OFF-state. However, unlocking the electronic device or executing the memo application to record a simple memo is inconvenient to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method of minimizing the number of processes required to record the memo in the electronic device and temporarily or permanently changing the recorded memo to have a format that allows the user to easily verify and manage.

In accordance with an aspect of the present disclosure, an electronic device is provided. The electronic device includes a display, an electronic pen, a slot in which the electronic pen can be inserted in or detached from, a pen sensing module configured to sense an insertion/detachment of the electronic pen, a pen input module configured to receive an input using the electronic pen, and a processor electrically connected to the display, the pen sensing module, and the pen input module. The processor is configured to activate the pen input module while the display maintains an OFF-state when the detachment of the electronic pen is sensed during the OFF-state of the display. In addition, the processor is configured to output a memo screen on the display based on a stroke input obtained from the pen input module and to change a screen output on the display in response to a memo termination event occurring by the pen input module.

In accordance with another aspect of the present disclosure, a method of providing a memo function of an electronic device is provided. The method includes sensing a detachment of an electronic pen from of a slot the electronic device when a display is in an OFF-state, activating an input function of the electronic pen, obtaining a stroke input by the electronic pen, outputting a memo screen on the display based on the stroke input, sensing a memo termination event, and changing a screen output on the display in response to the memo termination event.

In accordance with another aspect of the present disclosure, a computer-readable recording medium including instructions is provided. The instructions, when executed by an electronic device, cause the electronic device to perform a method of sensing a detachment of an electronic pen when a display of the electronic device is in an OFF-state, activating an input function of the electronic pen, obtaining a stroke input by the electronic pen, outputting a memo screen on the display based on the stroke input, sensing a memo termination event, and changing a screen output on the display in response to the memo termination event.

According to various embodiments of the present disclosure, an environment, which enables the user to input the memo, may be built by only detaching the electronic pen from the electronic device.

In addition, since the number of the elements required to be activated to record the memo is reduced, a power consumption of the electronic device may be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
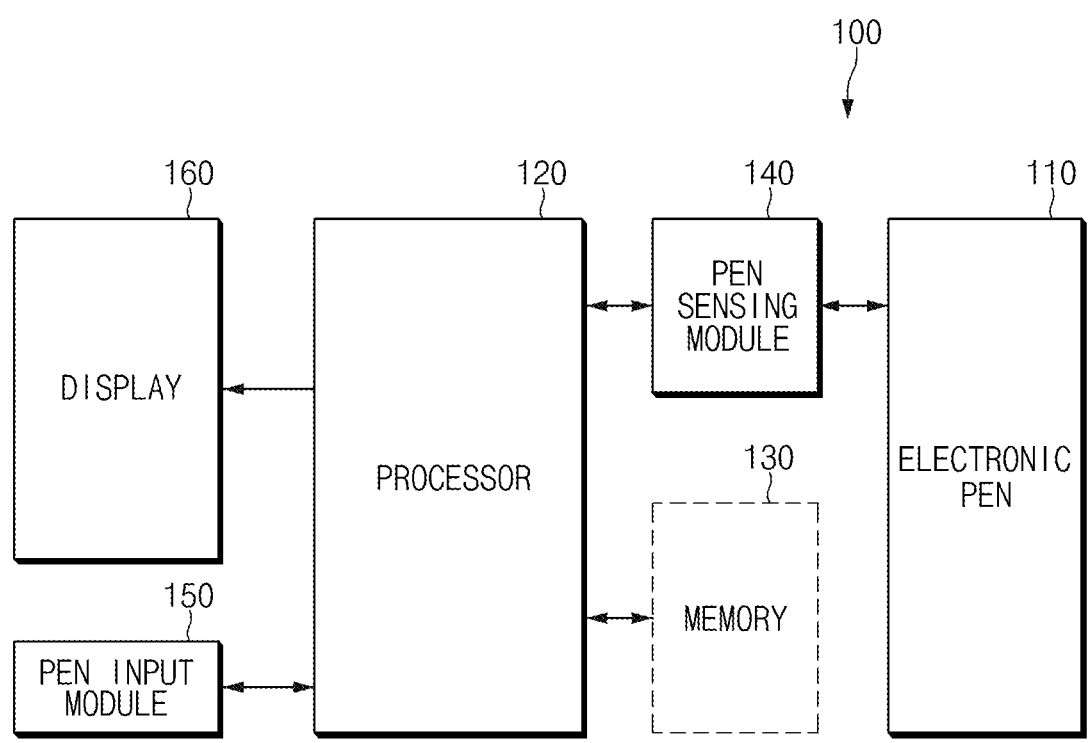
FIG. 1 illustrates a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms, which are defined in the specification, they may not be interpreted to exclude various embodiments of the present disclosure.

Hereinafter, an electronic device will be described with reference to accompanying drawings according to various embodiments. In the disclosure disclosed herein, a term "user" used herein may refer to a person who uses an electronic device or may refer to a device (e.g., an artificial electronic device) that uses the electronic device.

FIG. 1 illustrates a configuration of an electronic device according to an embodiment of the present disclosure.

Referring to FIG. 1, an electronic device 100 may include an electronic pen 110, a processor 120, a memory 130, a pen sensing module 140, a pen input module 150, and a display 160. Components shown in FIG. 1 may correspond to hardware devices required to implement embodiments disclosed in the present disclosure, and hardware/software components, which are apparent to those skilled in the art, may be additionally included in the electronic device 100. For example, a battery supplying a power to each component of the electronic device 100, a touch screen panel (TSP) sensing a touch input by a user, a communication module communicating with an external network, etc. may be included in the electronic device. In the following description of the present disclosure, various embodiments will be described based on the hardware devices shown in FIG. 1, but it may not be interpreted to exclude other hardware devices that may replace the hardware devices shown in FIG. 1 or may be added to the electronic device 100.

The electronic pen 110 may include all kinds of input members, such as a stylus, a touch pen, a capacitive type electronic pen, a resistive type electronic pen, etc., that may be mounted inside the electronic device 100 and provide a user input through the pen input module 150. The electronic device 100 configured to include the electronic pen 110 may include a spaced defined therein to accommodate the electronic pen 110. For example, the electronic device 100 may include a slot or a hole where the electronic pen 110 may be inserted in or may be detached from.

The processor 120 may communicate with the pen sensing module 140, the pen input module 150, and the display 160, which are electrically connected to the processor 120, through an inner bus. In addition, the processor 120 may receive a control message or a data message from the pen sensing module 140 and the pen input module 150 to control the display 160 based on the control message and the data message, and the processor 120 may perform operations associated with various embodiments disclosed in the present disclosure.

In a case that the electronic device 100 is a mobile device, the processor 120 may correspond to an AP. The processor 120 may have an appropriate shape or name in accordance with a kind of the electronic device 100. For example, the processor 120 may be implemented with a system on chip (SoC) configured by integrating a CPU, a graphic processing unit (GPU), or several processing cores.

In an embodiment, the processor 120 may be one of a plurality of processors included in the electronic device 100. For example, in a case that the electronic device 100 enters into a sleep state, the processors included in the electronic device 100 may be in the sleep state. In this case, when the electronic pen 110 is detached from the electronic device 100, a main processor maintains the sleep state, and only the processor 120 may be transited to an active state from the sleep state. For example, the main processor and the processor 120 may correspond to the AP and a communication processor (CP), respectively. As another example, the main processor may correspond to the CPU, and the processor 120 may correspond to the GPU. In the case that the processor 120 corresponds to one of the processors, the processor 120 may be assigned to perform operations associated with an input of an electronic pen and display from other processors.

In addition, the processor 120 may be implemented by a plurality of processors. For example, a first processor may be in charge of a message transmission between the processor 120 and the memory 130, the pen sensing module 140, and the pen input module 150, and a second processor may be in charge of controlling the display 160. Here, the processor 120 may be understood to include the first processor and the second processor.

The memory 130 may store a memo input by the pen input module 150 or a memo screen. For example, the memory 130 may store the input of the electronic pen 110, which is generated by the pen input module 150, in the unit of stroke or store the memo screen generated by the pen input 110. Furthermore, the memory 130 may separately store strokes included in the memo screen and background information on the memo screen. In the present disclosure, the term "memo" used herein may mean content generated by the electronic pen 110, but should not be limited to either a text or an image.

The memory 130 may store a memo application. In an embodiment of the present disclosure, a user's record (memo) may be output using the memo application.

The pen sensing module 140 may sense that the electronic pen 110 is detached from or inserted into the inside of the electronic device 100. The pen sensing module 140 may determine the detachment/attachment (or insertion) and a degree of the detachment/attachment of the electronic pen 110 using an electric or magnetic method. For example, the pen sensing module 140 may determine a length of a portion of the electronic pen 110, which is detached from the electronic device 100, or rate information on the length (e.g., about 35 mm or about 30%). When the detachment/attachment of the electronic pen 110 is sensed, the pen sensing module 140 may provide information on the detachment/attachment and the degree of the detachment/attachment to the processor 120.

The pen input module 150 may recognize the input through the electronic pen 110. Information on the recognized input (e.g., stroke) may be provided to the processor 120.

The pen input module 150 may be implemented in different configurations depending on an input method occurring by the electronic pen 110. For example, in a case that the electronic pen 110 provides a touch input, the pen input module 150 may be a module that is capable of recognizing the touch input or may be a TSP. In a case that the electronic pen 110 provides an optical input, the pen input module 150 may be a module configured to include an optical recognition sensor.

The display 160 may include, for example, a liquid crystal display (LCD), a light-emitting diode (LED) display, an organic LED (OLED) display, a microelectromechanical systems (MEMS) display, or an electronic paper display. According to an embodiment, the display 160 is implemented by an active-matrix organic light-emitting diode (AMOLED), and the display 160 may turn off corresponding elements to display a black background.

In addition, the display 160 may form a plurality of layers with the pen input module 150. In other words, the display 160 may include a layer configured to include a glass layer to protect the display 160 from external impacts, an AMOLED layer to display colors, and the pen input module 150 to recognize the pen input. The display 160 should not be limited to the above-mentioned configuration and may be implemented in various configurations depending on the kind of the electronic device 100.

Hereinafter, a method of providing a memo function using the electronic device 100 will be described in detail with reference to FIGS. 2 to 4.

Figure 2:
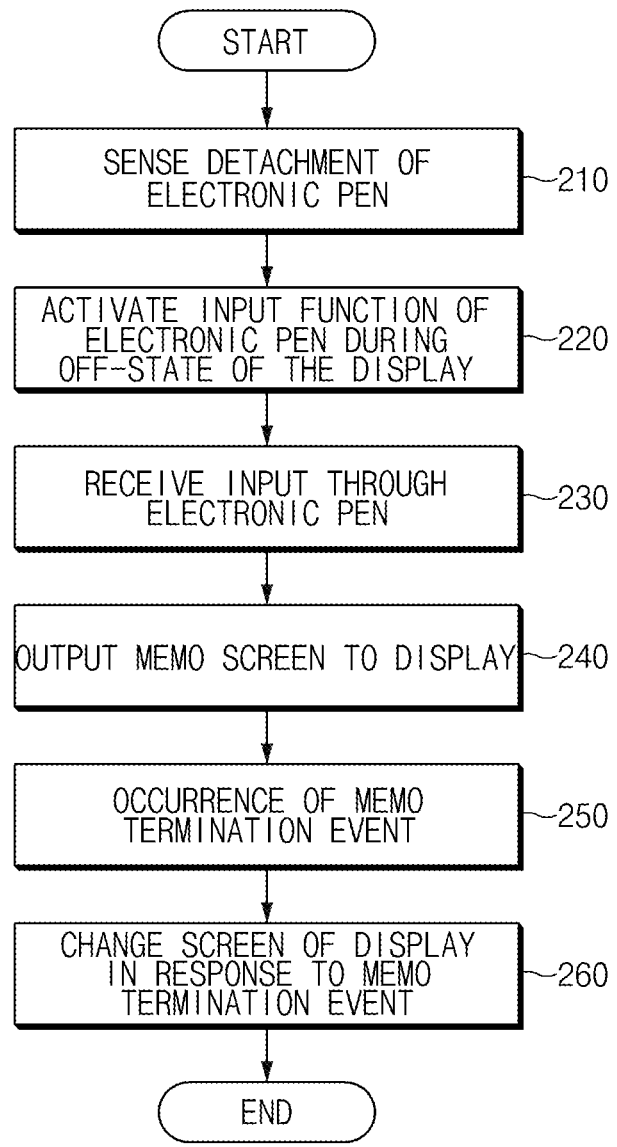
FIG. 2 illustrates a method of providing a memo function according to an embodiment of the present disclosure.

FIG. 2 illustrates a method of providing a memo function according to an embodiment of the present disclosure.

Referring to FIG. 2, a process of providing a memo function may start when the display 160 of the electronic device 100 is in an OFF-state. For example, the processes shown in FIG. 2 may start when the user turns off the display

160 by pushing a power button or a sleep button of the electronic device 100 or when the display 160 of the electronic device 100 becomes turned-off after a predetermined time lapses without the user input.

In operation 210, when the electronic pen 110 begins to be detached from the electronic device 100, the pen sensing module 140 may sense the detachment of the electronic pen 110. The pen sensing module 140 may obtain information indicating that the detachment of the electronic pen 110 begins and information on the detached degree (e.g., the length rate) of the electronic pen 110.

Figure 11:
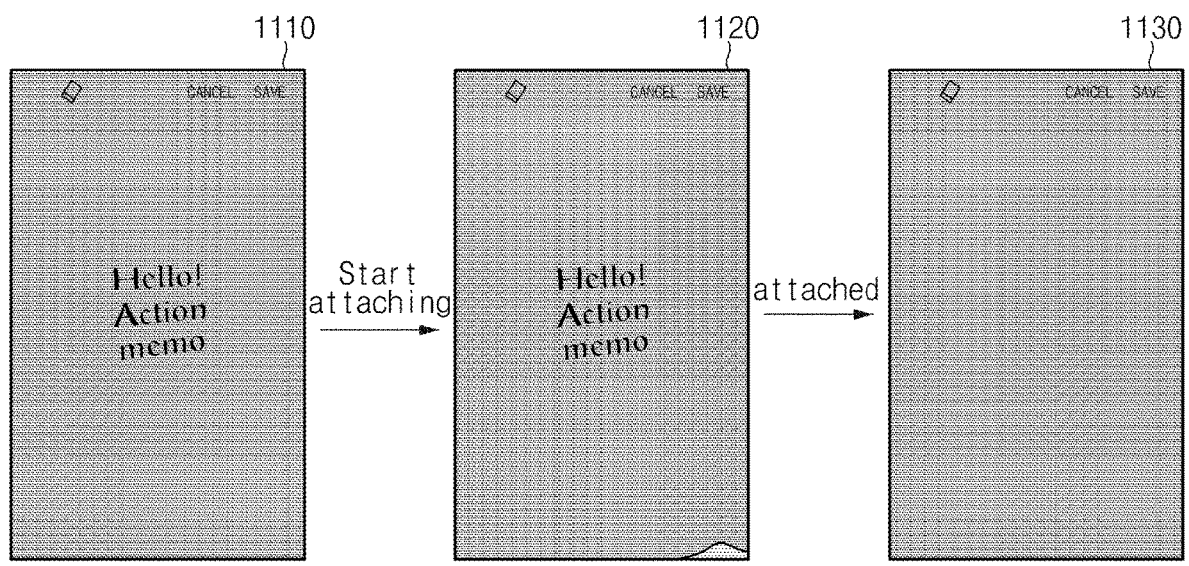
FIG. 11 illustrates a screen effect when an electronic pen is inserted according to an embodiment of the present disclosure.

When the electronic pen 110 is detached from the electronic device 100, the electronic device 100 may activate an input function of the electronic pen 110 to recognize the user input through the electronic pen 110 in operation 220. For example, the processor 120 may activate the pen input module 150. In this case, the display 160 may maintain the OFF-state. However, according to another embodiment, when the pen input module 150 is activated, a screen (e.g., a screen 1110 shown in FIG. 11) may be displayed on the display 160 to indicate that the memo function is available. However, although a screen effect, such as the screen shown in FIG. 11, is provided, the screen background may maintain the black color. Particularly, in case of the AMOLED-based display device, pixels (or elements corresponding to the pixels) other than characters or graphics indicating the availability of the memo may be in the OFF-state.

In operation 230, the electronic device 100 may receive the user input using the electronic pen 110. The user input may include a stroke input corresponding to the memo and a control input (e.g., delete, undo, re-do, save, initialize, etc.) editing the memo. The stroke input may form a content of the memo. The pen input module 150 may apply the obtained stroke to the processor 120, and the processor 120 may display the memo screen on the display 160 based on the stroke input provided from the pen input module 150 in operation 240. For example, the memo screen obtained by drawing Picasso's work as shown in FIG. 3 may be displayed on the display 160.

In operation 250, the electronic device 100 may sense that a memo termination event occurs. The memo termination event may be previously defined in various ways. For example, sensing the attachment of the electronic pen 110 to a mounting space of the electronic device 100 may correspond to the memo termination event. In addition, in the case that the electronic pen 110 provides the control input, the memo termination event may occur. For example, the display 160 may display a control menu corresponding to each control input through a certain area, and when a pre-defined control menu (e.g., store) is selected by the electronic pen 110, the processor 120 may determine that the memo termination event occurs. This operation will be described with reference to FIG. 3.

Figure 3:
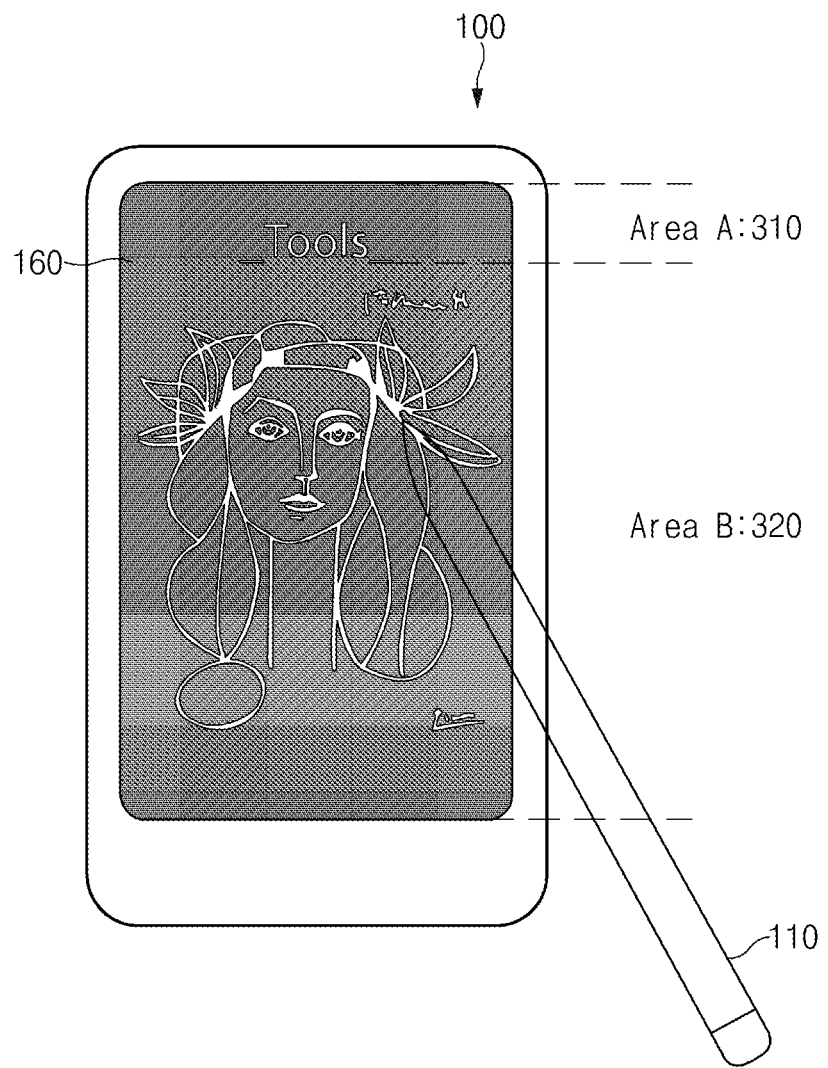
FIG. 3 illustrates a user interface for a memo function according to an embodiment of the present disclosure.

FIG. 3 illustrates a user interface for a memo function according to an embodiment of the present disclosure.

Referring to FIG. 3, the display 160 may be divided into two or more areas. For the convenience of explanation, the display 160 shown in FIG. 3 may be include an area 310 (AREA A) configured to include at least one control menu and an area 320 (AREA B) configured to receive the stroke input. For example, when the electronic pen 110 is detached from the electronic device 100, the processor 120 may set the display 160 to allow the area 310 and the area 320 to be distinguished from each other. For instance, the electronic device 100 may recognize the stroke input provided to the area 320 to output the graphic, but the stroke input provided to the area 310 may not be output. In addition, the area 310 and the area 320 may be not only functionally distinguished from each other but also visually distinguished from each other. For example, a thin line indicating a border between the area 310 and the area 320 may be shown.

Various control menus may be displayed on the area 310. For example, a delete menu deleting a certain area of the memo screen (changing the displayed graphic to the black background), an undo menu canceling the input in the unit of stroke, a re-do menu returning to a state before the undo menu is executed, a new memo or clear menu initializing a current memo screen, and a save menu saving the current memo screen may be appropriately arranged in the area 310. In addition, additional information, e.g., a name of memo, a writing time of memo, etc., may be displayed on the area 310. According to an embodiment, the area 310 may recognize not only the input through the electronic pen 110 but also the touch input by a user's hand. For example, the electronic device 100 may activate the TSP corresponding to the area 310 or the TSP corresponding to the whole display and ignore a touch input occurring in an area other than the area 310.

Referring to FIG. 2 again, when the electronic pen 110 is attached to the electronic device 100 again or the memo termination event, e.g., selection of the save menu in the area 310, occurs, the electronic device 100 may change the screen displayed on the display 160 in operation 260. For example, responsive to the memo termination event, the electronic device 100 may display a screen, which is different from the screen displayed before the occurrence of the memo termination event, on the display 160. The screen displayed on the display 160 after the memo termination event may be determined depending on the memo termination event, but additionally, the screen displayed on the display 160 after the memo termination event may be determined in accordance with the setting or status (e.g., whether a lock function of the electronic device 100 is set) of the electronic device 100. Hereinafter, a screen transition of the display 160 according to situations will be described with reference to FIG. 4.

Figure 4:
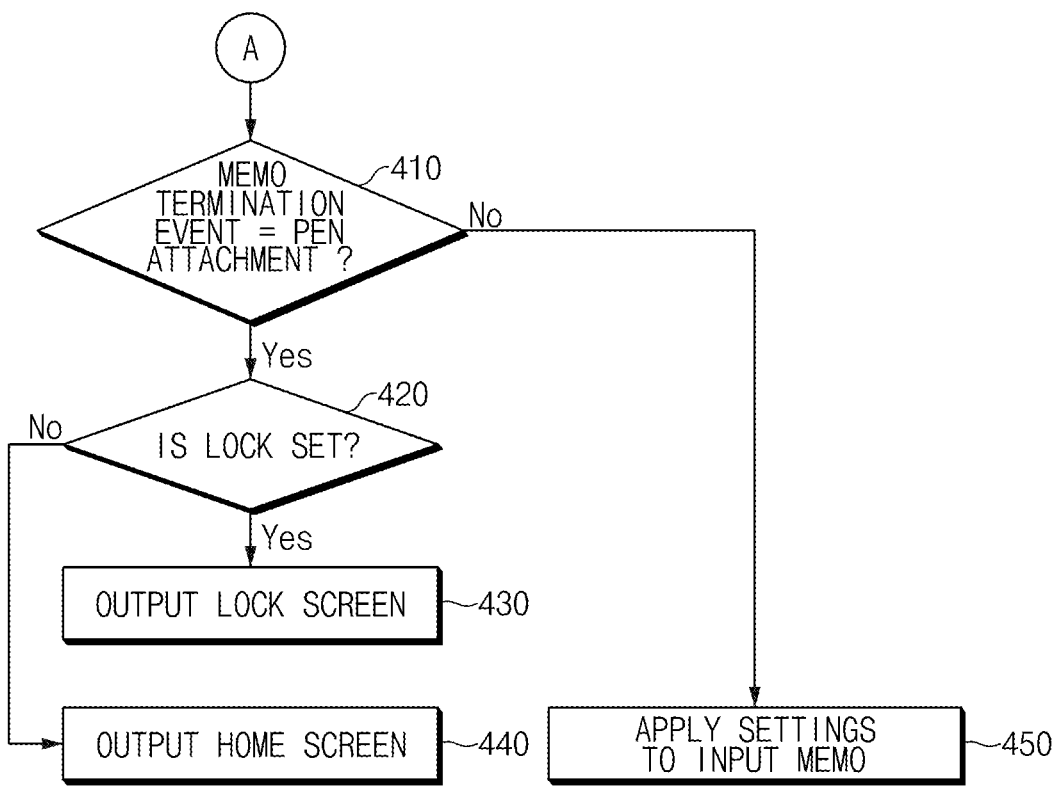
FIG. 4 illustrates a method of outputting a pre-defined screen on a display after the memo function is terminated according to an embodiment of the present disclosure.

FIG. 4 illustrates a method of outputting a pre-defined screen on a display after the memo function is terminated according to an embodiment of the present disclosure.

Referring to FIG. 4, the method may be performed after the appropriate operation among the operations shown in FIG. 2. For instance, an operation "A" shown in FIG. 4 may correspond to the operation 250 show in FIG. 2.

When the memo termination event occurs, the processor 120 may determine whether the memo termination event corresponds to the attachment of the electronic pen 110 in operation 410. For example, when the electronic pen 110 is attached to the electronic device 100 again after the memo is written, the pen sensing module 140 may provide information indicating the attachment of the electronic pen 140 to the processor 120, and the processor 120 may determine that the memo termination event occurs on the basis of the information from the pen sensing module 140.

In the case that it is determined that the memo function is terminated due to the attachment of the pen, the electronic device 100 may determine whether the electronic device 100 is locked in operation 420. In the case that the lock is set to the electronic device 100, the electronic device 100 may display a lock screen on the display 160 in operation 430. The lock screen may be output with the message associated with the memo screen generated in the operation 240. For example, the processor 120 may output a pre-defined lock screen (e.g., a screen requiring a password, a pattern input, a fingerprint recognition, etc.,) to the display 160 together with a message indicating that the memo exists or the memo is stored.

If in the case that the lock is not set, the electronic device 100 may output a home screen in operation 440. In this case, the electronic device 100 may display a message associated with the memo screen on the home screen in a popup message or a notification bar form.

In the case that it is determined that the memo function is terminated in a manner other than the attachment of the pen, e.g., in the case that the save menu is selected in the area 310, the electronic device 100 may apply pre-defined settings to the input memo (e.g., the memo screen in operation 240) in operation 450. The term "pre-defined settings" used herein may correspond to settings of the memo screen of the memo application installed in the electronic device 100. For example, the settings may include information on a background of the memo, a kind of pen (a brush, a ball pen, a fountain pen, a magic pen, etc.), a thickness of pen-tip, a color of pen, etc. As an example, when the save menu is selected, information on the background screen, information on the pen to be applied to the stroke, and information on the color of the pen may be applied to the memo screen (the current memo screen may be represented by only the black background and the color (e.g., a white or gray color) of the graphic corresponding to the stroke). In other words, the memo screen displayed on the display 160 may be displayed like the memo written while the memo application is executed.

The process described with reference to FIG. 4 may be varied in different ways. For example, when the electronic pen 110 is attached to the electronic device 100 again after the user writes the memo, the electronic device 100 may switch the display to the OFF-state like before the memo is written (before the electronic pen 110 is detached). In this case, the information on the memo screen may be verified when the user executes the memo application or another application (e.g., a photo application, a note application, a notification bar, etc.) in the electronic device 100 after being stored. Hereinafter, examples in which the settings are applied to the generated memo screen will be described with reference to FIGS. 5 to 7, and a whole process will be described with reference to FIG. 8.

Figure 5:
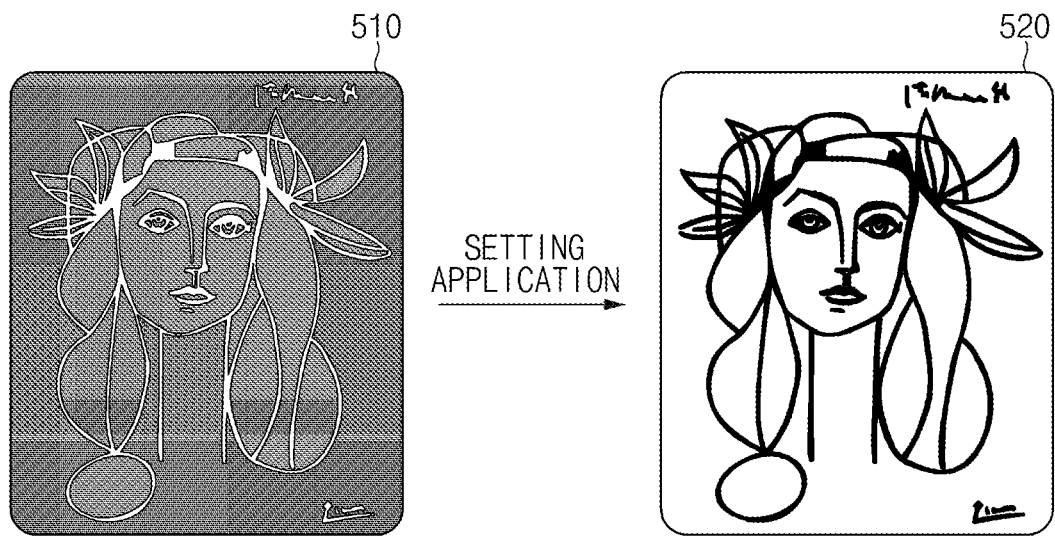
FIG. 5 illustrates a memo screen to which a pre-defined memo set is applied according to an embodiment of the present disclosure.

FIG. 5 illustrates a memo screen to which a pre-defined memo set is applied according to an embodiment of the present disclosure.

Referring to FIG. 5, a screen 510 may correspond to the memo screen generated in operation 240. The memo screen 510 may include the stroke expressed by white, gray, or arbitrary solid-color on a black background based on the input stroke. When the pre-defined settings are applied to the memo screen 510, a screen that is visually improved like the memo screen 520 or obtained when the memo is written in the memo application may be obtained. Such content conversion (content transfer) or file conversion (file transfer) may be carried out in several stages of embodiments disclosed in the present disclosure. For example, the content conversion may be carried out in the case that the memo termination event occurs, and the converted memo screen may be stored in the memory 130. As another way, when the memo termination event occurs, information on the memo screen 510 may be stored, but when the memo screen 510 is loaded later in the memo application, setting information on the current memo application may be applied to the memo screen 510 or setting information on the memo application at the time at which the memo screen 510 is generated may be applied to the memo screen 510 to display a memo screen 520 on the display 160.

Figure 6:
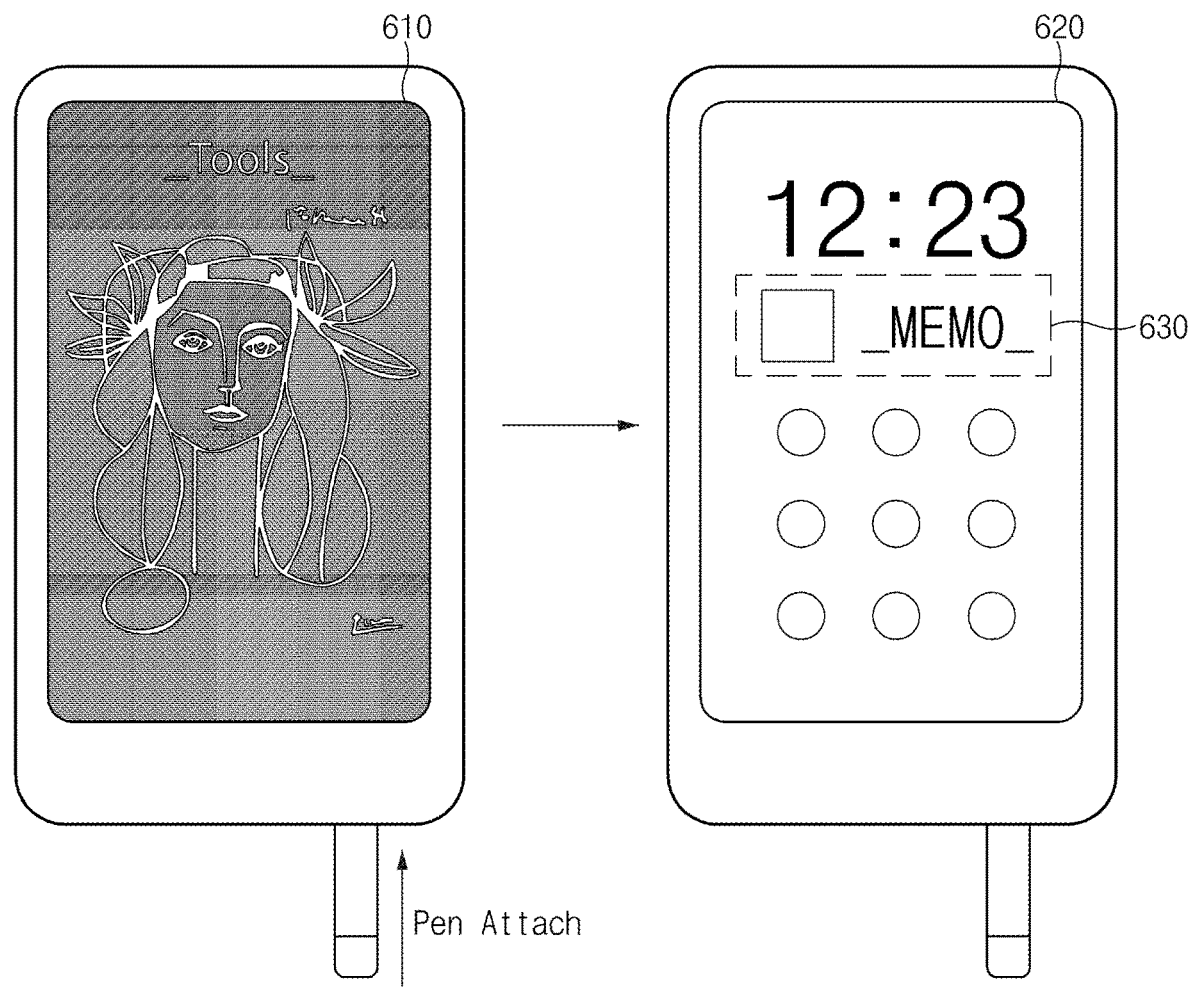
FIG. 6 illustrates a screen displaying a memo message and a lock screen according to an embodiment of the present disclosure.

FIG. 6 illustrates a screen displaying a memo message and a lock screen according to an embodiment of the present disclosure. FIG. 6 shows an example corresponding to the lock screen output as the result of executing operation 430 of FIG. 4.

Referring to FIG. 6, a screen 610 may correspond to the memo screen described in FIG. 3. In other words, the screen 610 may correspond to a memo screen generated based on a memo input with respect to a certain area divided from the entire area of the display 160. However, the screen 610 may correspond to a memo screen generated with respect to the entire area of the display 160.

When the electronic pen 110 is inserted into the electronic device 100 (or the attachment of the electronic pen 110 is completed), the electronic device 100 may display a lock screen 620. The lock screen 620 may include a message 630 indicating that a memo exists. The message 630 may include the name of the memo, the writing time of the memo, and the like, which are automatically generated by the electronic device 100. In addition, according to an embodiment, the above-mentioned file conversion (or the content conversion) may be performed at the time at which the attachment of the electronic pen 110 is completed.

Figure 7:
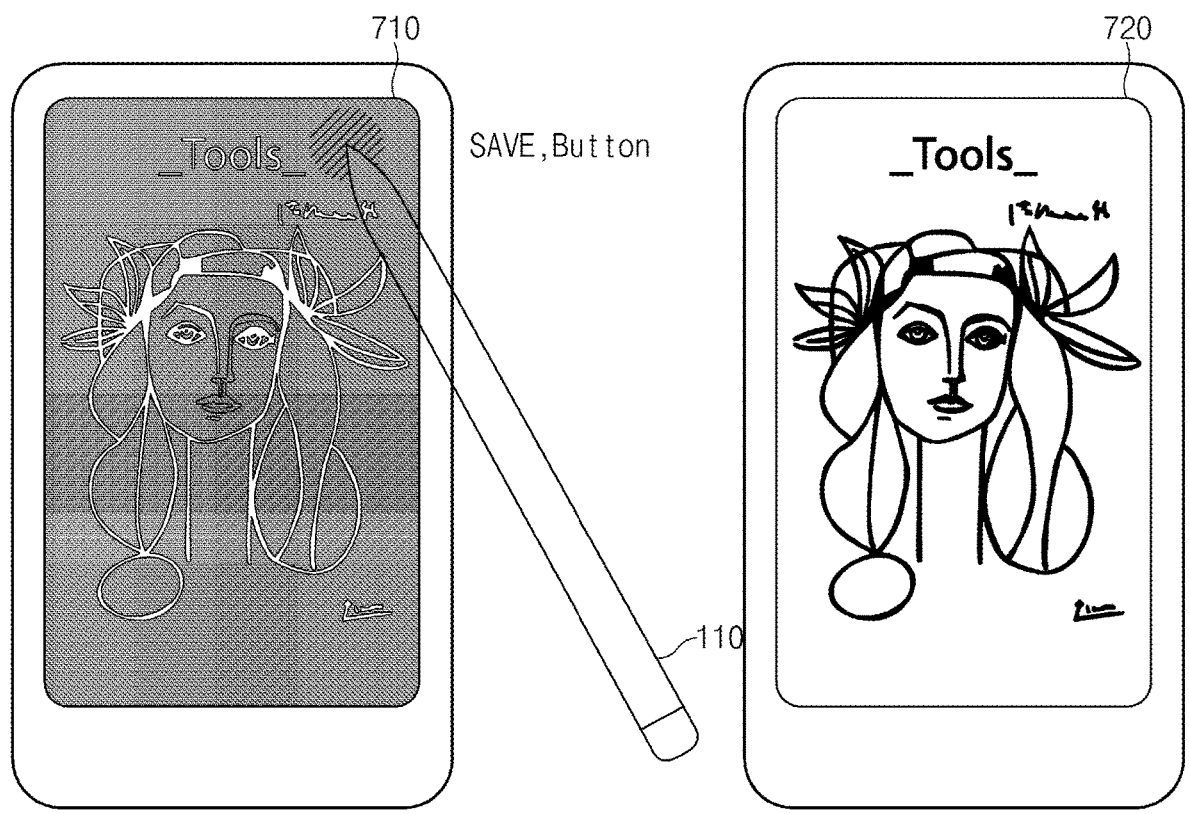
FIG. 7 illustrates a memo screen output corresponding to a memo termination event according to an embodiment of the present disclosure.

FIG. 7 illustrates a memo screen output corresponding to a memo termination event according to an embodiment of the present disclosure. FIG. 7 shows an example corresponding to a screen output as the result of executing operation 450 of FIG. 4.

Referring to FIG. 7, a screen 710 may correspond to an example showing that the memo is input to the divided area described in FIG. 3.

When the save button located at the area in which the control menu is displayed is selected by the electronic pen 110, the electronic device 100 may apply pre-defined settings to the memo screen 710 to convert the memo screen 710 displayed on the display 160 to a memo screen 720. According to an embodiment, the memo screen may be stored by the touch input of the user instead of the electronic pen 110 as described above.

According to an embodiment, the memo screen 710 may be temporarily converted to the memo screen 720 by selecting the save button or a preview menu in the control menu. For example, when the save button is pushed without attaching the electronic pen 110 to the electronic device 100, the electronic device 100 may determine that the user continuously performs the writing of the memo. Accordingly, the electronic device 100 may temporarily display a screen that is to be displayed in the memo application, and thus the user may know in advance how the memo created by the user will be shown later. In addition, in the case that the preview menu is selected, the electronic device 100 may output the memo screen 720 only during a time period in which the preview menu is selected by the electronic pen 110 or the user's finger.

Figure 8:
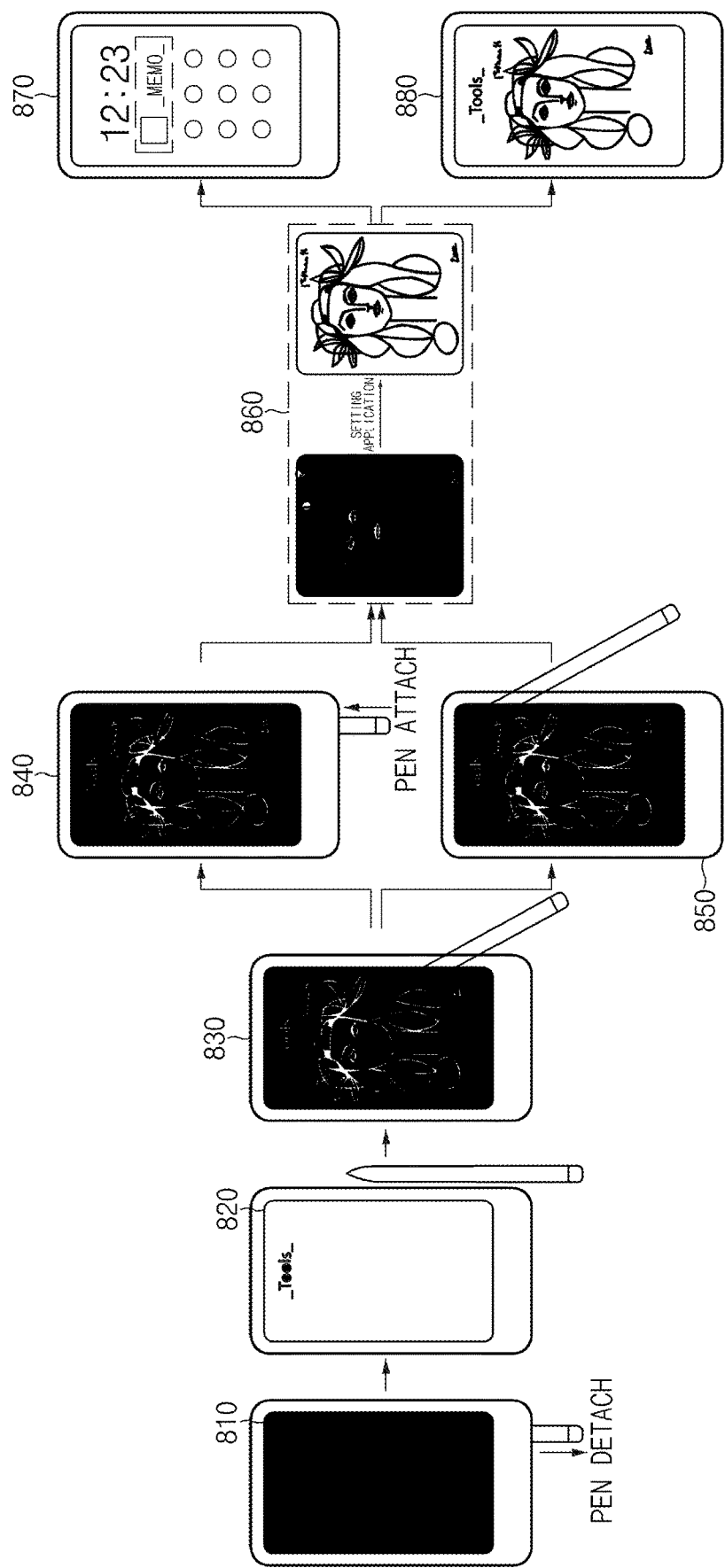
FIG. 8 illustrates processes of generating and storing a user's record according to an embodiment of the present disclosure.

FIG. 8 illustrates processes of generating and storing a user's record according to an embodiment of the present disclosure. FIG. 8 shows the processes in which the user starts the memo function, writes the memo, and saves the memo using the electronic pen 110. In addition, the term "operation" used in FIGS. 8 and 9 may be understood as a kind of "state".

Referring to FIG. 8, in operation 810, the electronic pen 110 may start to be detached from the electronic device 100. The display 160 of the electronic device 100 may maintain the OFF-state until the electronic pen 110 is completely detached from the electronic device 100. According to an embodiment, although the electronic pen 110 is completely detached from the electronic device 100, the display 160 may continuously maintain the OFF-state.

In operation 820, when the electronic pen 110 is completely detached from the electronic device 100, the memo function may be activated. For example, the pen input module 150 may be activated to sense the input of the electronic pen 110. In addition, an indication, a message, a graphic, or an icon may be displayed to indicate that the memo function is activated. An area except for the display area may continuously maintain the black background. The term "black background" used herein means that corresponding elements are in the OFF-state in the case that the display 160 is the AMOLED-based device.

In operation 830, the electronic device 100 may receive the stroke input from the electronic pen 110. In the case that the display 160 is divided into two or more areas in operation 820, the stroke may be input to the pre-defined area. During operation 830, the electronic device 100 may display the memo screen based on the input obtained from the electronic pen 110.

Operations 840 and 850 may correspond to the storing of the memo input in operation 830. Operation 840 may show the memo termination event occurring by the attachment of the electronic pen 110 to the electronic device 100, and operation 850 may show the memo termination event occurring by the selection of the control menu. Since the memo termination event is described in the above-mentioned embodiments, details thereof will be omitted.

In operation 860, the file conversion may be performed on the memo screen generated in operation 840 or operation 850. For example, the pre-defined setting information may be applied to the stroke information and the background information to convert the memo screen, and the converted screen may be stored. However, as described above, operation 860 may be performed later when the memo application is executed.

In operation 870, the electronic device 100 may output the message associated with the memo together with the lock screen. Furthermore, in operation 880, the electronic device 100 may output the memo screen to which the pre-defined settings are applied. Operation 870 may be performed after operation 840, but operation 880 may be performed after operation 840 according to embodiments. Similarly, operation 880 may be performed after operation 850, but operation 870 may be performed after operation 850 according to an embodiment.

Figure 9:
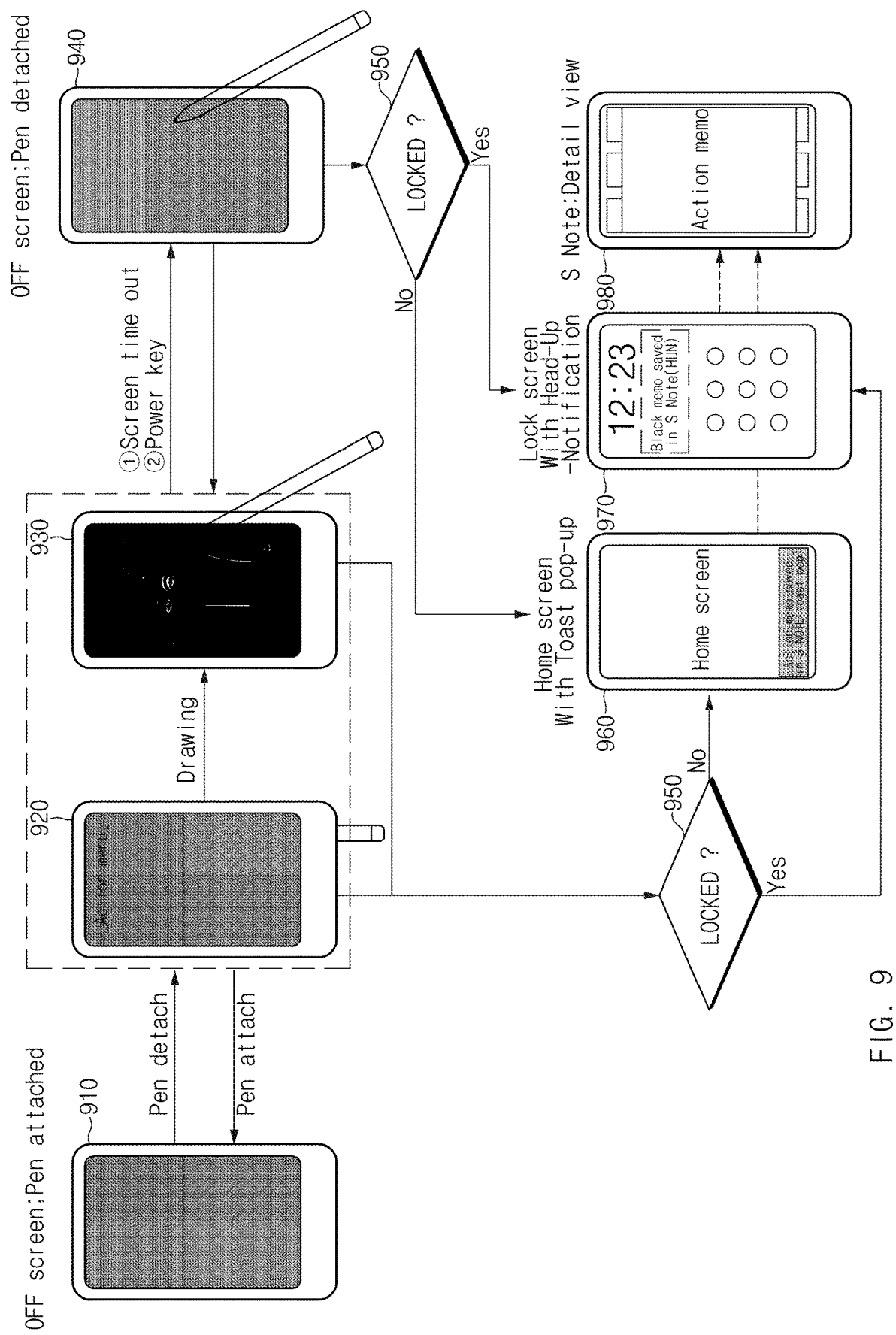
FIG. 9 illustrates a conversion process of a display screen according to an embodiment of the present disclosure.

FIG. 9 illustrates a conversion process of a display screen according to an embodiment of the present disclosure. In FIG. 9, descriptions duplicated with, similar to, or corresponding to those described with reference to FIGS. 1 to 8 will be omitted.

Referring to FIG. 9, in operation 910, when the electronic pen 110 is detached, the memo function may be activated (e.g., the pen input module 150 is activated) as shown in operation 920. While in this state, when the electronic pen 110 is inserted again without any memo, the conversion process may return to operation 910.

In operation 920, when the memo is input through the electronic pen 110, the memo screen may be displayed on the display 160 as shown in operation 930.

In operation 930, when the display enters the OFF-state itself after a predetermined time lapses or the power button (key) is pushed by the user, the process may proceed to operation 940. When entering operation 940, the memo screen may be stored. In the case that the home button is selected or the display 160 is switched to the ON-state by the pre-defined input, the process may proceed to operation 960 or operation 970 in accordance with whether the electronic device 100 is locked or not as determined in operation 950.

In the case that the pre-defined input, e.g., the home button or back key, occurs, or the save/cancel button is selected by the electronic pen 110 in operation 920, the process may proceed to operation 960 or operation 970 in accordance with whether the electronic device 100 is locked or not (if the electronic pen 110 is inserted, the process may proceed to operation 910) as determined in operation 950. In the case that the pre-defined input, e.g., the home button or back key, occurs, the save or cancel button is selected by the electronic pen 110, or the electronic pen 110 is inserted, the process may proceed to operation 960 or operation 970 in accordance with whether the electronic device 100 is locked or not.

In the case that the electronic device 100 is not locked, the electronic device 100 may output the home screen with the message associated with the memo in operation 960. In the case that the electronic device 100 is locked, the electronic device 100 may output the home screen with the message associated with the memo in operation 970. If the memo is not input in operation 920, the message associated with the memo may be omitted. In addition, in the case that the memo application is executed after the electronic device 100 is unlocked in operation 960 or operation 970, the memo screen generated in operation 930 may be displayed on the display 160 in operation 980. In this case, the memo screen to which the settings of the memo application are applied may be displayed on the display 160.

Figure 10:
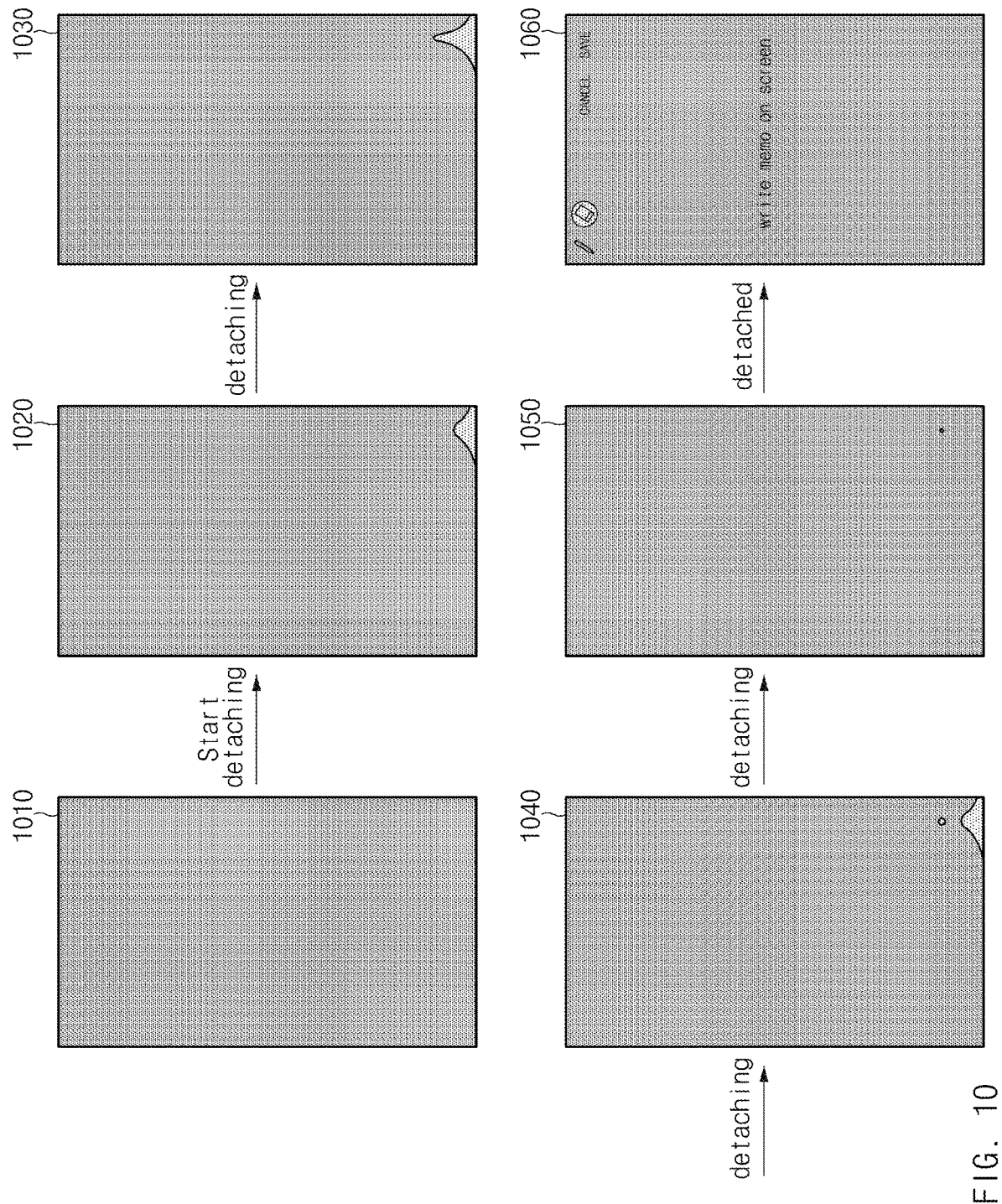
FIG. 10 illustrates a screen effect when an electronic pen is detached according to an embodiment of the present disclosure.

FIG. 10 illustrates a screen effect when an electronic pen is detached according to an embodiment of the present disclosure.

Referring to FIG. 10, when the electronic pen 110 is detached from or inserted into the electronic device 100, an appropriate visual effect may be output through the display 160. In embodiments described with reference to FIGS. 10 to 12, at least a portion of the display may not be in the OFF-state during the attachment of the electronic pen 110.

The display 160 may be in the OFF-state (black color) as a screen 1010 right before the electronic pen 110 is detached. When the electronic pen 110 is detached, the visual effect, which is changed depending on the degree of the detachment of the electronic pen 110, may be output through a position corresponding to the electronic pen 110. For example, a screen 1020 may be the visual effect corresponding to the state in which the degree of the detachment of the electronic pen 110 is about 20%, a screen 1030 may be the visual effect corresponding to the state in which the degree of the detachment of the electronic pen 110 is about 40%, a screen 1040 may be the visual effect corresponding to the state in which the degree of the detachment of the electronic pen 110 is about 60%, a screen 1050 may be the visual effect corresponding to the state in which the degree of the detachment of the electronic pen 110 is about 80%, and a screen 1060 may be the visual effect corresponding to the state in which the electronic pen 110 is completely detached. These rates may be merely illustrative and embodiments and adjusted for a natural effect.

According to various embodiments, the visual effect may be continuously expressed. For example, the pen sensing module 140 may continuously determine the degree of the detachment of the electronic pen 110 and provide information on the detachment degree of the electronic pen 110 to the processor 120. The processor 120 may control the display 160 to allow various visual effects, such as a fluid effect, to be continuously output in accordance with the detachment degree of the electronic pen 110. In addition, the visual effect may be displayed such that the fluid is expanded or bounded in a direction opposite to the direction in which the electronic pen 110 is detached from the electronic device 100. However, according to an embodiment, the visual effect may be provided in the direction in which the electronic pen 110 is detached from the electronic device 100 or as an arbitrary pattern.

FIG. 11 illustrates a screen effect when an electronic pen is inserted according to an embodiment of the present disclosure. The process shown in FIG. 11 may be understood as an opposite process to the process shown in FIG. 10.

Referring to FIG. 11, when the electronic pen 110 starts to be inserted in a state in which a screen 1110 is output, a visual effect corresponding to the attachment of the electronic pen 110 may be output (screen 1120) through the area corresponding to the position at which the electronic pen 110 is inserted. When the electric pen 110 is completely inserted, a screen 1130 may be output in which the visual effect may disappear and the display may be switched to the OFF-state. However, as the above-described various embodiments, different screens may be output in accordance with the lock state of the electronic device.

Figure 12:
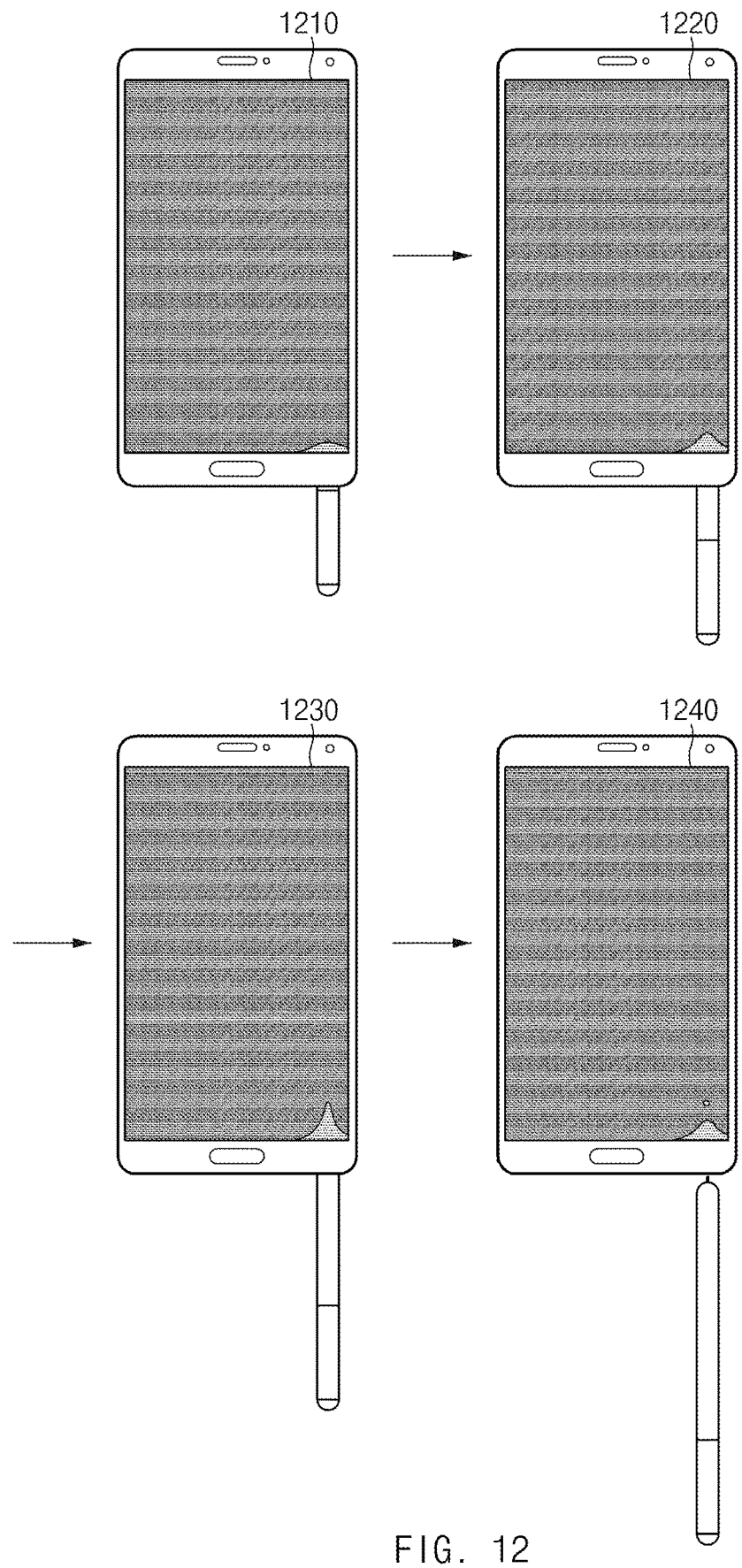
FIG. 12 illustrates a screen effect caused by the attachment/detachment of the electronic pen according to an embodiment of the present disclosure.

FIG. 12 illustrates a screen effect caused by the attachment/detachment of the electronic pen according to an embodiment of the present disclosure.

Referring to FIG. 12, the electronic pen 110 may be attached to or detached from a right lower end portion of the electronic device 100. The position to which the electronic pen 110 is attached may be different depending on the kind and shape of the electronic pen 100, and a smart phone (e.g., Galaxy Note series) equipped with an electronic pen will be described with reference to FIG. 12 as a representative example.

As shown in a screen 1210, when the electronic pen 110 starts to be detached, a detachment effect may appear at a position corresponding to the electronic pen 110. In this state, the more the electronic pen 110 is detached, the larger the detachment effect is displayed as shown in a screen 1220. Then, when the electronic pen 110 is further detached, the visual effect may be varied as shown in a screen 1230, and if the electronic pen 110 is inserted again, the visual effect as shown in the screen 1210 may be output. That is, the visual effect may be different depending on the degree of the detachment or attachment of the electronic pen 110 before the electronic pen 110 is completely detached. For example, the visual effect may appear in the direction opposite to the direction to which the electronic pen 110 moves. However, in the case that the electronic pen 110 is inserted again after the electronic pen 110 is completely detached as shown in a screen 1240, the visual effect may be output to the direction to which the electronic pen 110 moves as shown in FIG. 11. In other words, different visual effects may be displayed in an initial state of the visual effect in accordance with whether the electronic pen 110 is completely inserted or whether the electronic pen 110 is completely detached.

Hereinafter, various configurations that are included or may be included in the electronic device 100 will be described with reference to FIGS. 13 to 15.

Figure 13:
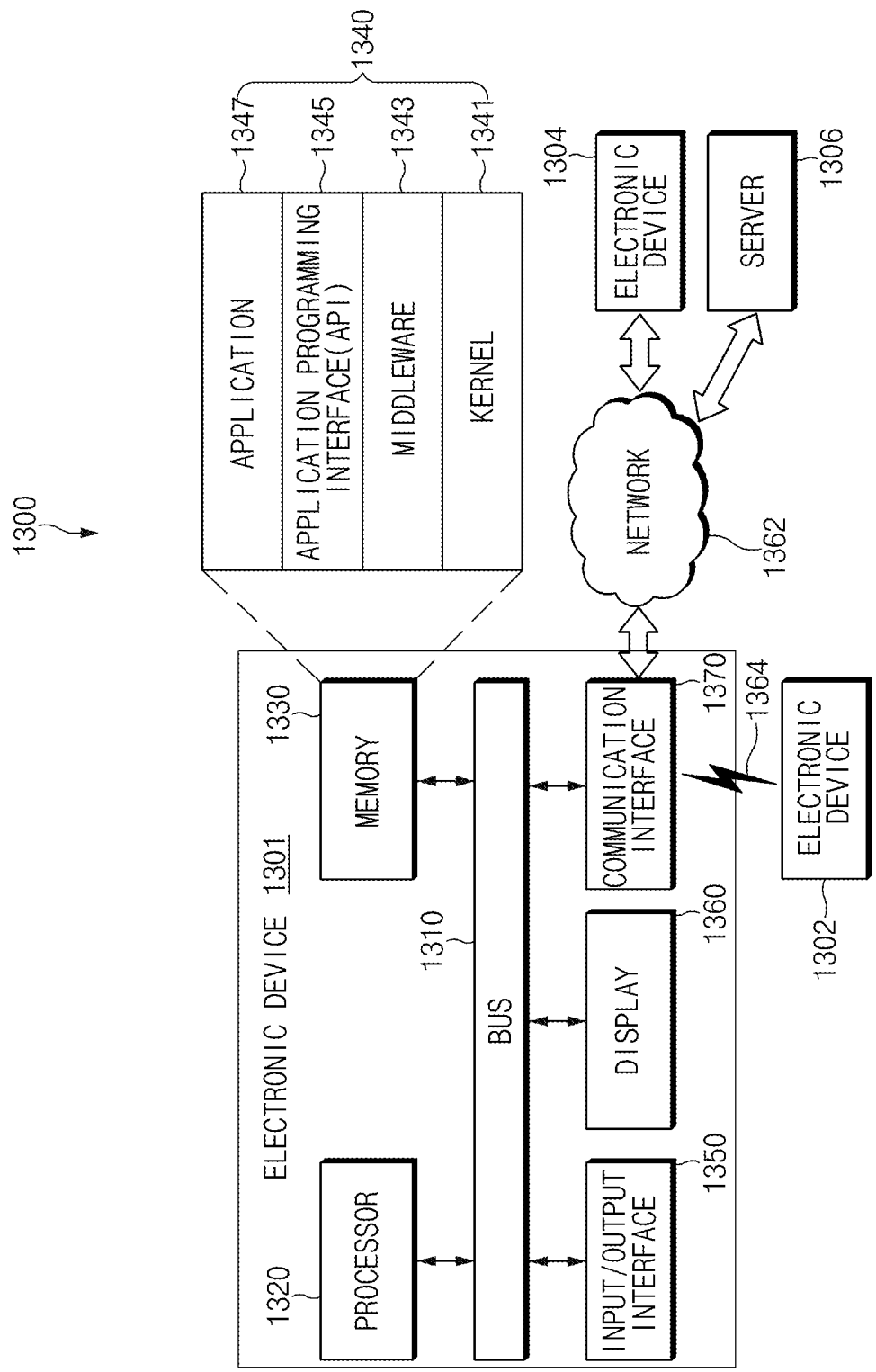
FIG. 13 illustrates an electronic device in a network environment according to various embodiments of the present disclosure.

FIG. 13 illustrates an electronic device in a network environment according to various embodiments of the present disclosure.

Referring to FIG. 13, tan electronic device 1301 is provided in a network environment 1300 according to various embodiments. The electronic device 1301 may include a bus 1310, a processor 1320, a memory 1330, an input/output (I/O) interface 1350, a display 1360, and a communication interface 1370. According to an embodiment, among the elements of the electronic device 1301, at least one of the above-mentioned elements may be omitted, or other additional elements may be added.

The bus 1310 may interconnect the above-described components 1131 to 1370 and may be a circuit for conveying communications (e.g., a control message and/or data) among the above-described components.

The processor 1320 may include one or more of a CPU, an AP, or a CP. The processor 1320 may perform, for example, data processing or an operation associated with control and/or communication of at least one other component(s) of the electronic device 1301.

The memory 1330 may include a volatile and/or nonvolatile memory. The memory 1330 may store instructions or data associated with at least one other component(s) of the electronic device 1301. According to an embodiment, the memory 130 may store software and/or a program 1340. The program 1340 may include, for example, a kernel 1341, a middleware 1343, an application programming interface (API) 1345, and/or an application program (or an application) 1347. At least a portion of the kernel 1341, the middleware 1343, or the API 1345 may be called an "operating system (OS)".

The kernel 1341 may control or manage system resources (e.g., the bus 1310, the processor 1320, the memory 1330, and the like) that are used to execute operations or functions of other programs (e.g., the middleware 1343, the API 1345, and the application program 1347). Furthermore, the kernel 1341 may provide an interface that allows the middleware 1343, the API 1345, or the application program 1347 to access discrete components of the electronic device 1301 so as to control or manage system resources.

The middleware 1343 may perform a mediation role such that the API 1345 or the application program 1347 communicates with the kernel 1341 to exchange data.

Furthermore, the middleware 1343 may process task requests received from the application program 1347 according to a priority. For example, the middleware 1343 may assign the priority, which makes it possible to use a system resource (e.g., the bus 1310, the processor 1320, the memory 1330, or the like) of the electronic device 1301, to at least one of the application program 1347. For example, the middleware 1343 may process the one or more task requests according to the priority assigned to the at least one application program, which makes it possible to perform scheduling or load balancing on the one or more task requests.

The API 1345 may be an interface through which the application program 1347 controls a function provided by the kernel 1341 or the middleware 1343. The API 1345 may include, for example, at least one interface or function (e.g., an instruction) for a file control, a window control, an image processing, a text control, or the like.

The I/O interface 1350 may perform an interface role to transmit an instruction or data, input from a user or another external device, to other component(s) of the electronic device 1301. Furthermore, the I/O interface 1350 may output an instruction or data, received from other component(s) of the electronic device 1301, to a user or another external device.

The display 1360 may display, for example, various contents (e.g., a text, an image, a video, an icon, a symbol, and the like) to a user. The display 1360 may include a touch screen and may receive, for example, a touch, gesture, proximity, or hovering input using an electronic pen or a portion of a user's body.

The communication interface 1370 may establish communication between the electronic device 1301 and an external device (e.g., a first external electronic device 1302, a second external electronic device 1304, or a server 1306). For example, the communication interface 1370 may be connected to the network 1362 through wireless communication to communicate with the external device (e.g., the second external electronic device 1304 or the server 1306).

The wireless communication may include at least one of, for example, long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include, for example, a local area network 1364. The local area network 1364 may include, for example, at least one of wireless fidelity (Wi-Fi), Bluetooth (BT), near field communication (NFC), or global navigation satellite system (GNSS). The GNSS may include, for example, at least one of global positioning system (GPS), global navigation satellite system (Glonass), Beidou navigation satellite system (Beidou), or the European global satellite-based navigation system (Galileo). Hereinafter, GPS and GNSS may be interchangeably used in the following descriptions. The wired communication may include at least one of, for example, a universal serial bus (USB), a high definition multimedia interface (HDMI), a recommended standard-232 (RS-232), or a plain old telephone service (POTS).

Each of the first and second external electronic devices 1302 and 1304 may include components the same as or different from those of the electronic device 1301. According to an embodiment, the server 1306 may include one or more server groups. According to various embodiments, all or a part of operations that the electronic device 1301 will perform may be executed by another or plural electronic devices (e.g., the first and second electronic devices 1302 and 1304 or the server 1306). According to an embodiment, in the case where the electronic device 1301 executes any function or service automatically or in response to a request, the electronic device 1301 may not perform the function or the service internally, but, alternatively additionally, it may request at least a portion of a function associated with the electronic device 1301 at other device (e.g., the first and second electronic devices 1302 and 1304 or the server 1306). The other electronic device (e.g., the first and second electronic device 1302 and 1304 or the server 1306) may execute the requested function or additional function and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Figure 14:
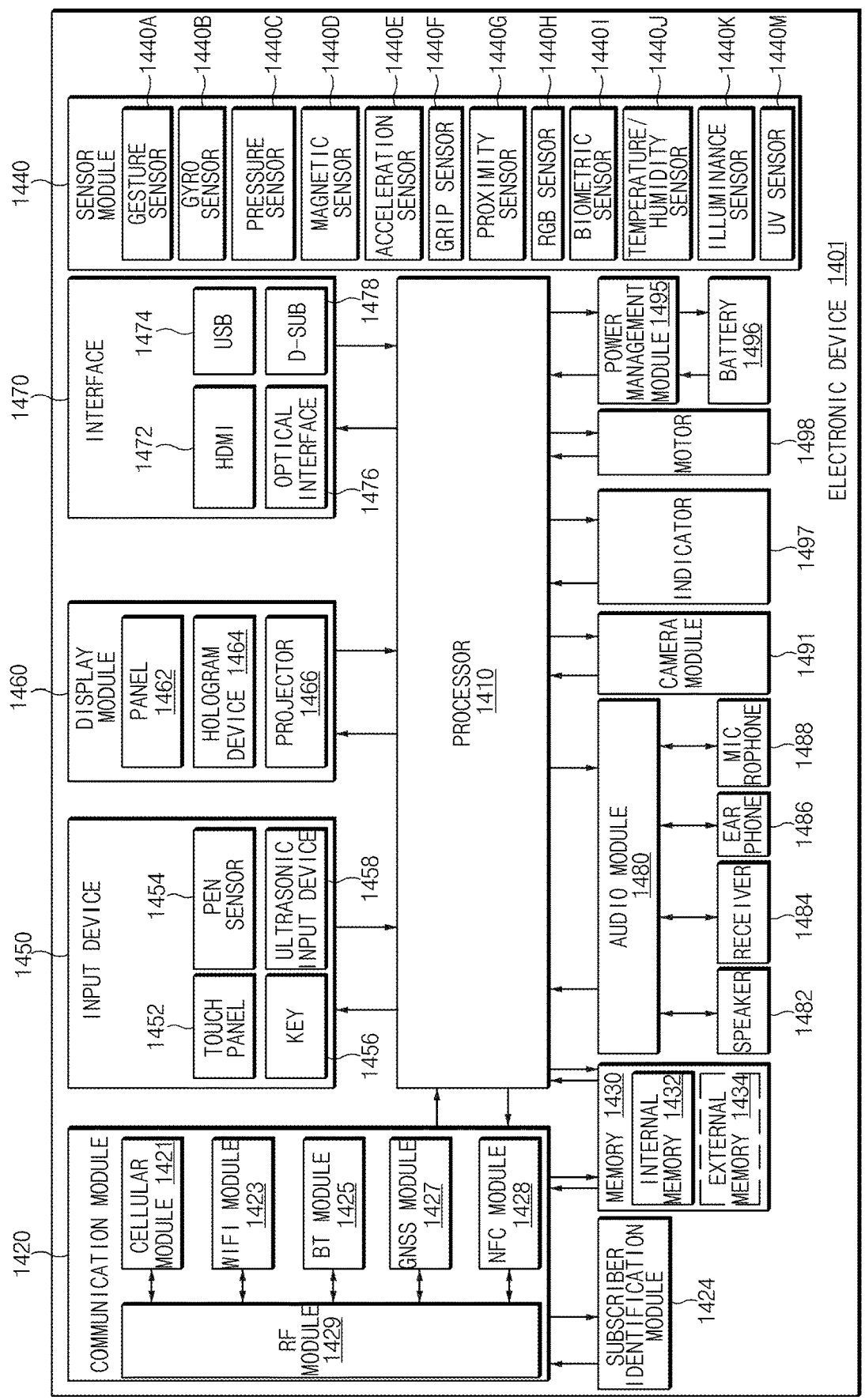
FIG. 14 illustrates a block diagram of an electronic device according to various embodiments of the present disclosure.

FIG. 14 illustrates a block diagram of an electronic device according to various embodiments of the present disclosure.

Referring to FIG. 14, an electronic device 1401 may include, for example, all or a part of the electronic device 1301 illustrated in the above-mentioned various embodiments. The electronic device 1401 may include one or more processors (e.g., an AP) 1410, a communication module 1420, a subscriber identification module 1424, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may drive an OS or an application program to control a plurality of hardware or software components connected to the processor 1410 and may process and compute a variety of data. The processor 1410 may be implemented with a SoC, for example. According to an embodiment of the present disclosure, the processor 1410 may further include a GPU and/or an image signal processor (ISP). The processor 1410 may include at least a part (e.g., a cellular module 1421) of components illustrated in FIG. 14. The processor 1410 may load and process an instruction or data, which is received from at least one of other components (e.g., a nonvolatile memory), and may store a variety of data at a nonvolatile memory.

The communication module 1420 may be configured the same as or similar to the communication interface 1370 of FIG. 13. The communication module 1420 may include the cellular module 1421, a wireless-fidelity (Wi-Fi) module 1423, a BT module 1425, a GNSS module 1427 (e.g., a GPS module, a Glonass module, a Beidou module, a Galileo module, etc.), a NFC module 1428, and a radio frequency (RF) module 1429.

The cellular module 1421 may provide voice communication, video communication, a text service, an Internet service or the like through a communication network. According to an embodiment, the cellular module 1421 may perform discrimination and authentication of the electronic device 1401 within a communication network using the subscriber identification module 1424 (e.g., a subscriber identification module (SIM) card), for example. According to an embodiment, the cellular module 1421 may perform at least a portion of functions that the processor 1410 provides. According to an embodiment, the cellular module 1421 may include a CP.

Each of the Wi-Fi module 1423, the BT module 1425, the GNSS module 1427, and the NFC module 1428 may include a processor for processing data exchanged through a corresponding module, for example. According to an embodiment, at least a portion (e.g., two or more components) of the cellular module 1421, the Wi-Fi module 1423, the BT module 1425, the GNSS module 1427, and the NFC module 1428 may be included within one integrated circuit (IC) or an IC package.

The RF module 1429 may transmit and receive a communication signal (e.g., an RF signal). The RF module 1429 may include a transceiver, a power amplifier module (PAM), a frequency filter, a low noise amplifier (LNA), an antenna, or the like. According to another embodiment, at least one of the cellular module 1421, the Wi-Fi module 1423, the BT module 1425, the GNSS module 1427, or the NFC module 1428 may transmit and receive an RF signal through a separate RF module.

The subscriber identification module 1424 may include, for example, a card and/or embedded SIM including a subscriber identification module and may include unique identify information (e.g., integrated circuit card identifier (ICCID)) or subscriber information (e.g., integrated mobile subscriber identity (IMSI)).

The memory 1430 (e.g., a memory 1330) may include an internal memory 1432 or an external memory 1434. For example, the internal memory 1432 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory (e.g., a NAND flash memory or a NOR flash memory), a hard drive, or a solid state drive (SSD).

The external memory 1434 may include a flash drive, for example, compact flash (CF), secure digital (SD), micro-SD, mini-SD, extreme digital (xD), multimedia card (MMC), a memory stick, or the like. The external memory 1434 may be functionally and/or physically connected to the electronic device 1401 through various interfaces.

The sensor module 1440 may measure, for example, a physical quantity or may detect an operation state of the electronic device 1401. The sensor module 1440 may convert the measured or detected information to an electric signal. The sensor module 1440 may include at least one of a gesture sensor 1440A, a gyro sensor 1440B, a pressure sensor 1440C, a magnetic sensor 1440D, an acceleration sensor 1440E, a grip sensor 1440F, a proximity sensor 1440G, a color sensor 1440H (e.g., red, green, blue (RGB) sensor), a biometric sensor 1440I, a temperature/humidity sensor 1440J, an illuminance sensor 1440K, or an ultra violet (UV) sensor 1440M. Although not illustrated, additionally or alternatively, the sensor module 1440 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one or more sensors included therein. According to an embodiment, the electronic device 1401 may further include a processor which is a part of the processor 1410 or independent of the processor 1410 and is configured to control the sensor module 1440. The processor may control the sensor module 1440 while the processor 1410 remains at a sleep state.

The input device 1450 may include, for example, a touch panel 1452, a (digital) pen sensor 1454, a key 1456, or an ultrasonic input unit 1458. The touch panel 1452 may use at least one of capacitive, resistive, infrared and ultrasonic detecting methods. Also, the touch panel 1452 may further include a control circuit. The touch panel 1452 may further include a tactile layer to provide a tactile reaction to a user.

The (digital) pen sensor 1454 may be, for example, a part of a touch panel or may include an additional sheet for recognition. The key 1456 may include, for example, a physical button, an optical key, a keypad, and the like. The ultrasonic input device 1458 may detect (or sense) an ultrasonic signal, which is generated from an input device, through a microphone (e.g., a microphone 1488) and may check data corresponding to the detected ultrasonic signal.

The display 1460 (e.g., a display 1360) may include a panel 1462, a hologram device 1464, or a projector 1466. The panel 1462 may include a configuration that is the same as or similar to that of the display 1360 of FIG. 13. The panel 1462 may be, for example, flexible, transparent, or wearable. The panel 1462 and the touch panel 1452 may be integrated into a single module. The hologram device 1464 may display a stereoscopic image in a space using a light interference phenomenon. The projector 1466 may project light onto a screen so as to display an image. The screen may be arranged in the inside or the outside of the electronic device 1401. According to an embodiment, the display 1460 may further include a control circuit for controlling the panel 1462, the hologram device 1464, or the projector 1466.

The interface 1470 may include, for example, an HDMI 1472, a USB 1474, an optical interface 1476, or a D-sub-miniature (D-sub) 1478. The interface 1470 may be included, for example, in a communication interface 1370 illustrated in FIG. 13. Additionally, or alternatively, the interface 1470 may include, for example, a mobile high definition link (MHL) interface, a secure digital (SD) card/MMC interface, or an infrared data association (IrDA) standard interface.

The audio module 1480 may convert a sound and an electric signal in dual directions. At least a portion of the audio module 1480 may be included, for example, in an I/O interface 1350 illustrated in FIG. 13. The audio module 1480 may process, for example, sound information that is input or output through a speaker 1482, a receiver 1484, an earphone 1486, or the microphone 1488.

The camera module 1491 for shooting a still image or a video may include, for example, at least one image sensor (e.g., a front sensor or a rear sensor), a lens, an ISP, or a flash (e.g., an LED or a xenon lamp).

The power management module 1495 may manage, for example, power of the electronic device 1401. According to an embodiment, a power management integrated circuit (PMIC), a charger IC, or a battery or fuel gauge may be included in the power management module 1495. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, or a rectifier, and the like. The battery gauge may measure, for example, a remaining capacity of the battery 1496 and a voltage, current or temperature thereof while the battery is charged. The battery 1496 may include, for example, a rechargeable battery or a solar battery.

The indicator 1497 may display a specific state of the electronic device 1401 or a portion thereof (e.g., a processor 1410), such as a booting state, a message state, a charging state, and the like. The motor 1498 may convert an electrical signal into a mechanical vibration and may generate effects such as vibration, haptic, and the like. Although not illustrated, a processing device (e.g., a GPU) for supporting a mobile TV may be included in the electronic device 1401. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 15:
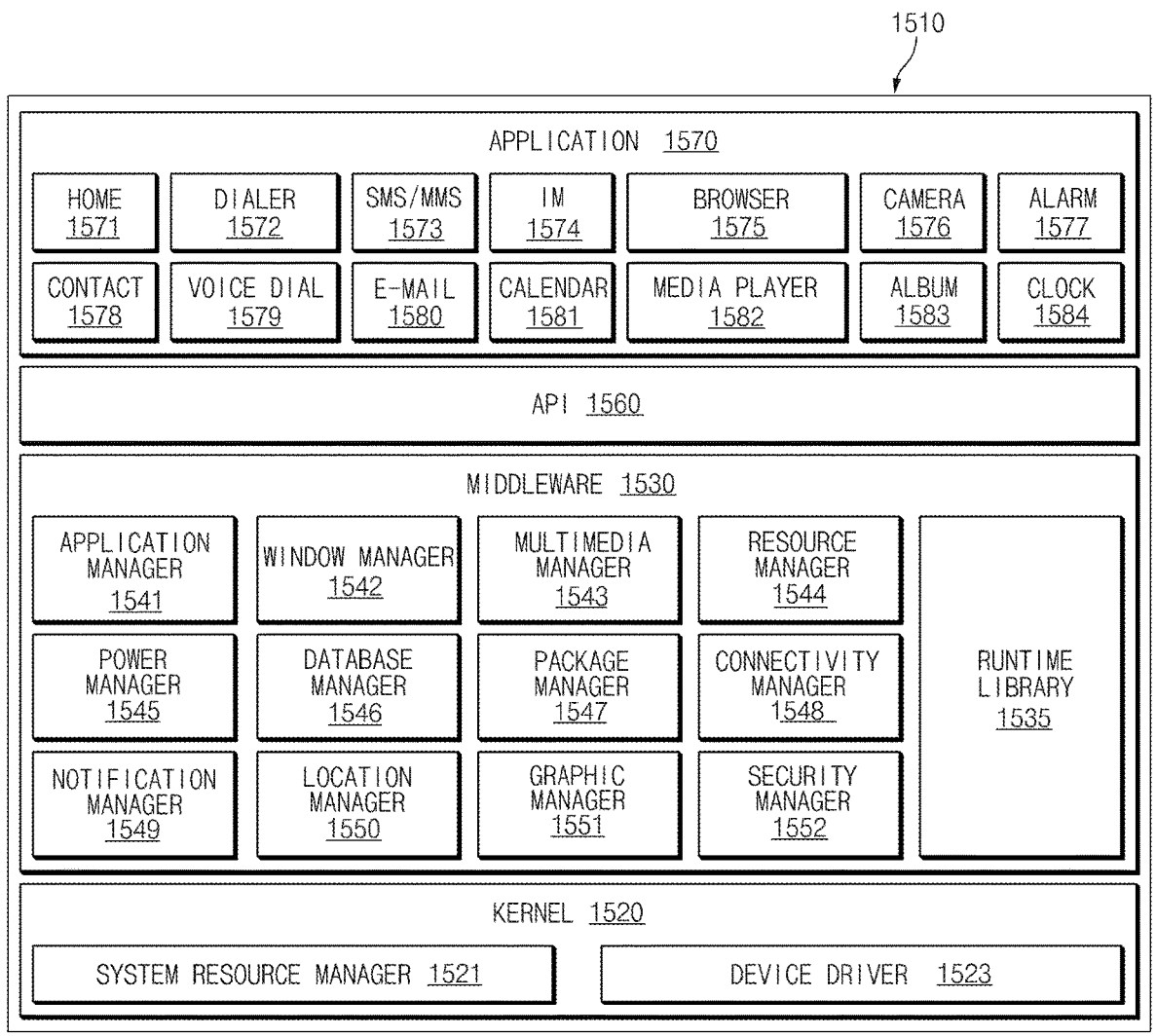
FIG. 15 illustrates a block diagram of a program module according to various embodiments of the present disclosure.

FIG. 15 illustrates a block diagram of a program module according to various embodiments of the present disclosure.

Referring to FIG. 15, according to an embodiment, a program module 1510 (e.g., a program 1340) may include an OS to control resources associated with an electronic device (e.g., an electronic device 1310) and/or diverse applications (e.g., an application program 1347) driven on the OS. The OS may be, for example, Android, iOS, Windows, Symbian, or Tizen.

The program module 1510 may include a kernel 1520, a middleware 1530, an API 1560, and/or an application 1570. At least a part of the program module 1510 may be pre-loaded on an electronic device or may be downloadable from an external electronic device (e.g., electronic devices 1302 and 1304, a server 1306).

The kernel 1520 (e.g., a kernel 1341) may include, for example, a system resource manager 1521 and/or a device driver 1523. The system resource manager 1521 may perform control, allocation, or retrieval of system resources. According to an embodiment, the system resource manager 1521 may include a process managing part, a memory managing part, or a file system managing part. The device driver 1523 may include, for example, a display driver, a camera driver, a BT driver, a common memory driver, an USB driver, a keypad driver, a Wi-Fi driver, an audio driver, or an inter-process communication (IPC) driver.

The middleware 1530 may provide, for example, a function which the application 1570 needs in common, or may provide diverse functions to the application 1570 through the API 1560 to allow the application 1570 to efficiently use limited system resources of the electronic device. According to an embodiment, the middleware 1530 may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, or a security manager 1552.

The runtime library 1535 may include, for example, a library module which is used by a compiler to add a new function through a programming language while the application 1570 is being executed. The runtime library 1535 may perform I/O management, memory management, or capacities about arithmetic functions.

The application manager 1541 may manage, for example, a life cycle of at least one application of the application 1570. The window manager 1542 may manage a graphical user interface (GUI) resource which is used in a screen. The multimedia manager 1543 may identify a format necessary for playing diverse media files, and may perform encoding or decoding of media files by using a codec suitable for the format. The resource manager 1544 may manage resources such as a storage space, memory, or source code of at least one application of the application 1570.

The power manager 1545 may operate, for example, with a basic input/output system (BIOS) to manage a battery or power, and may provide power information for an operation of an electronic device. The database manager 1546 may generate, search for, or modify database which is to be used in at least one application of the application 1570. The package manager 1547 may install or update an application which is distributed in the form of package file.

The connectivity manager 1548 may manage, for example, wireless connection such as Wi-Fi or BT. The notification manager 1549 may display or notify an event such as arrival message, promise, or proximity notification in a mode that does not disturb a user. The location manager 1550 may manage location information of an electronic device. The graphic manager 1551 may manage a graphic effect that is provided to a user, or manage a user interface relevant thereto. The security manager 1552 may provide a general security function necessary for system security or user authentication. According to an embodiment, in the case where an electronic device (e.g., an electronic device 1301) includes a telephony function, the middleware 1530 may further include a telephony manager for managing a voice or video call function of the electronic device.

The middleware 1530 may include a middleware module that combines diverse functions of the above-described components. The middleware 1530 may provide a module specialized to each OS kind to provide differentiated functions. Additionally, the middleware 1530 may remove a part of the preexisting components, dynamically, or may add a new component thereto.

The API 1560 (e.g., an API 1345) may be, for example, a set of programming functions and may be provided with a configuration which is variable depending on an OS. For example, in the case where an OS is the android or the iOS, it may be permissible to provide one API set per platform. In the case where an OS is the Tizen, it may be permissible to provide two or more API sets per platform.

The application 1570 (e.g., an application program 1347) may include, for example, one or more applications capable of providing functions for a home 1571, a dialer 1572, an short message service (SMS)/multimedia messaging service (MMS) 1573, an instant message (IM) 1574, a browser 1575, a camera 1576, an alarm 1577, a contact 1578, a voice dial 1579, an e-mail 1580, a calendar 1581, a media player 1582, an album 1583, and a timepiece 1584, or for offering health care (e.g., measuring an exercise quantity or blood sugar) or environment information (e.g., atmospheric pressure, humidity, or temperature).

According to an embodiment, the application 1570 may include an application (hereinafter referred to as "information exchanging application" for descriptive convenience) to support information exchange between the electronic device (e.g., an electronic device 1301) and the external electronic device (e.g., electronic devices 1302 and 1304). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., electronic devices 1302 and 1304). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., electronic devices 1302 and 1304), which communicates with the electronic device, an application running in the external electronic device, or a service (e.g., a call service or a message service) provided from the external electronic device.

According to an embodiment, the application 1570 may include an application (e.g., a health care application of mobile medical devices) which is assigned in accordance with an attribute of the external electronic device (e.g., electronic devices 1302 and 1304). According to an embodiment, the application 1570 may include an application which is received from the external electronic device (e.g., the server 1306 or the external electronic devices 1302 and 1304). According to an embodiment, the application 1570 may include a preloaded application or a third party application which is downloadable from a server. The component titles of the program module 1510 according to the embodiment of the present disclosure may be modifiable depending on kinds of OSs.

According to various embodiments, at least a portion of the program module 1510 may be implemented by software, firmware, hardware, or a combination of two or more thereof. At least a portion of the program module 1510 may be implemented (e.g., executed), for example, by a processor (e.g., a processor 1410). At least a portion of the program module 1510 may include, for example, modules, programs, routines, sets of instructions, processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media in the form of a programmable module. The computer-readable storage media may be, but is not limited to, the memory 1330.

A computer-readable recording media may include a hard disk, a floppy disk, a magnetic media (e.g., a magnetic tape), an optical media (e.g., compact disc ROM (CD-ROM) and a digital versatile disc (DVD), a magneto-optical media (e.g., a floptical disk), and a hardware device (e.g., ROM, RANI, a flash memory, or the like). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

For example, a computer-readable recording medium according to an embodiment includes instructions. The instructions, when executed by an electronic device, cause the electronic device to perform a method performed by sensing a detachment of an electronic pen mounted in the electronic device when a display of the electronic device is in an OFF-state, activating an input function of the electronic pen, obtaining a stroke input by the electronic pen, outputting a memo screen on the display based on the stroke input, sensing a memo termination event, and changing a screen output on the display in response to the memo termination event.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a pen;
a slot in which the pen can be inserted or detached;
a pen sensor;
a pen input interface; and
at least one processor electrically connected to the display, the pen sensor, and the pen input interface,
wherein the at least one processor is configured to:
while the display is in an OFF-state, sense via the pen sensor, at least a partial detachment of the pen from the slot,
in response to the at least the partial detachment of the pen during the OFF-state of the display being sensed, activate the pen input interface and display a memo screen with a black color background,
sense an insertion of the pen into the slot while the memo screen with the black color background is displayed, and
in response to the insertion of the pen into the slot being sensed, display a first screen when the electronic device is in a locked state and display a second screen different from the first screen when the electronic device is not in the locked state.

2. The electronic device of claim 1, wherein, in response to the insertion of the pen being sensed, the at least one processor is further configured to store the memo screen.

3. The electronic device of claim 2, wherein the at least one processor is further configured to display the stored memo screen in response to a memo application being executed.

4. The electronic device of claim 1, wherein the first screen comprises a lock screen.

5. The electronic device of claim 1, wherein the second screen comprises a screen that was displayed before the display entered the OFF-state.

6. The electronic device of claim 5, wherein the screen that was displayed before the display entered the OFF-state comprises a home screen.

7. The electronic device of claim 1,
wherein, in response to the at least the partial detachment of the pen during the OFF-state of the display being sensed, the at least one processor is further configured to display the memo screen including a first area receiving a stroke input and a second area including at least one control menu with respect to the stroke input, and
wherein the at least one control menu comprises a save menu with respect to a memo input to the first area.

8. The electronic device of claim 1, wherein the at least one processor is further configured to:
sense, via the pen input interface, a pen stroke input on the memo screen, and display the pen stroke input in a white color over the black color background of the memo screen.

9. The electronic device of claim 1, wherein the display is implemented by an active matrix organic light-emitting diode (AMOLED).

10. A method of providing a memo function of an electronic device, the method comprising:
- while a display of the electronic device is in an OFF-state, sensing, via a pen sensor of the electronic device, at least a partial detachment of a pen from a slot of the electronic device;
- in response to the sensing of the at least the partial detachment of the pen during the OFF-state of the display, activating an input interface of the pen and displaying a memo screen with a black color background;
- sensing an insertion of the pen into the slot while the memo screen with the black color background is displayed; and
- in response to the sensing of the insertion of the pen into the slot, displaying a first screen when the electronic device is in a locked state or displaying a second screen when the electronic device is not in the locked state.

11. The method of claim 10, further comprising:

in response to the sensing of the insertion of the pen into the slot, storing the memo screen.

12. The method of claim 11, further comprising:

displaying the stored memo screen on a memo application in response to the memo application being executed.

13. The method of claim 10, wherein the first screen comprises a lock screen.

14. The method of claim 10, wherein a screen that was displayed before the display entered the OFF-state comprises a home screen.

* * * * *